US011986836B2

(12) United States Patent
Zhai et al.

(10) Patent No.: US 11,986,836 B2
(45) Date of Patent: May 21, 2024

(54) DEVICE AND METHOD FOR THE ADDITION OF LIQUID ADDITIVES IN THE FORM OF A SPRAY DURING A JET MILLING STEP IN A PROCESS FOR THE MANUFACTURE OF SINTERED NdFeB ALLOY MAGNETS

(71) Applicant: Yantai Dongxing Magnetic Materials Inc., Yantai (CN)

(72) Inventors: Yulong Zhai, Yantai (CN); Sijing Lyu, Yantai (CN); Dajun Zhao, Yantai (CN); Xiaochen Zhai, Yantai (CN); Kaihong Ding, Yantai (CN)

(73) Assignee: Yantai Dongxing Magnetic Materials Inc., Yantai (CN)

( * ) Notice: Subject to any disclaimer, the term of this patent is extended or adjusted under 35 U.S.C. 154(b) by 128 days.

(21) Appl. No.: 17/464,722

(22) Filed: Sep. 2, 2021

(65) Prior Publication Data

US 2022/0105522 A1 Apr. 7, 2022

(30) Foreign Application Priority Data

Sep. 3, 2020 (CN) ......................... 202010917549.2

(51) Int. Cl.
*B02C 23/18* (2006.01)
*B22F 9/04* (2006.01)

(52) U.S. Cl.
CPC ........ *B02C 23/18* (2013.01); *B22F 2009/044* (2013.01)

(58) Field of Classification Search
CPC .......... B22F 2009/041; B22F 2009/044; B22F 9/04; B22F 1/10; B22F 1/0003;
(Continued)

(56) References Cited

U.S. PATENT DOCUMENTS 5,449,502 A 9/1995 Igusa et al.
5,472,661 A 12/1995 Gay
(Continued)

FOREIGN PATENT DOCUMENTS

CN 202367198 U 8/2012
CN 103521758 A 1/2014
(Continued)

OTHER PUBLICATIONS

Corresponding JP search report dated Oct. 3, 2022.
Corresponding EP search result dated Feb. 4, 2022.

*Primary Examiner* — Scott R Kastler
(74) *Attorney, Agent, or Firm* — Samson G. Yu

(57) ABSTRACT

The present disclosure refers to a device and a method for the addition of liquid additives in the form of a spray during a jet milling step in a process for the manufacture of sintered NdFeB alloy magnets. The device includes: a storage barrel for the liquid additive; a weighing bucket which is in fluid communication with the storage barrel and is adapted for weighing a predetermined amount of the liquid additive; a powder container to accommodate NdFeB alloy material prior to or after jet milling, wherein the powder container includes an opening that is plugged with a blind flange; a connecting pipe, which is in fluid communication with the weighing bucket and passes through an opening of the blind flange into the interior of the powder container; and a fluid atomization nozzle located at the end of the connection pipe.

12 Claims, 2 Drawing Sheets

(58) Field of Classification Search
CPC ......... B02C 23/18; B02C 19/06; B05B 5/032; B05B 5/0418; B05B 5/081; B05B 5/1683; B05B 7/14; B05B 7/1404; B05B 7/1409; B05B 7/1413; B05B 7/1418; B05B 7/1422; B05B 7/1427; B05B 7/1431; B05B 7/1436; B05B 7/144; B05B 7/1445; B05B 7/145; B05B 7/1454; B05B 7/1459; B05B 7/1463; B05B 7/1468; B05B 7/1472; B05B 7/1477; B05B 7/1481; B05B 7/1486; B05B 7/149; B05B 7/1495
See application file for complete search history.

(56) References Cited

U.S. PATENT DOCUMENTS

| | | | |
|---|---|---|---|
| 2003/0000773 A1 | 1/2003 | Engler et al. | |
| 2022/0105522 A1 * | 4/2022 | Zhai | B02C 23/18 |

FOREIGN PATENT DOCUMENTS

| | | | | |
|---|---|---|---|---|
| CN | 204294934 U | 4/2015 | | |
| CN | 206678180 U | 11/2017 | | |
| CN | 108421982 A | 8/2018 | | |
| CN | 109200909 A | 1/2019 | | |
| CN | 110767401 A | 2/2020 | | |
| CN | 110860249 A | 3/2020 | | |
| CN | 210905803 U | 7/2020 | | |
| CN | 111940748 A | * | 11/2020 | B02C 19/06 |
| CN | 212217092 U | 12/2020 | | |
| EP | 3819043 A1 | 5/2021 | | |
| JP | 50110134 U | 9/1975 | | |
| JP | H10032133 A | 2/1998 | | |
| JP | 2002285208 A | 10/2002 | | |
| JP | 2013111513 A | 6/2013 | | |
| JP | 2015070141 A | 4/2015 | | |

* cited by examiner

DEVICE AND METHOD FOR THE ADDITION OF LIQUID ADDITIVES IN THE FORM OF A SPRAY DURING A JET MILLING STEP IN A PROCESS FOR THE MANUFACTURE OF SINTERED NdFeB ALLOY MAGNETS

CROSS-REFERENCE TO RELATED APPLICATION

The present disclosure claims priority to Patent Application No. 202010917549.2, filed to the China National Intellectual Property Administration on Sep. 3, 2020 and entitled "Device and method for the addition of liquid additives in the form of a spray during a jet milling step in a process for the manufacture of sintered NdFeB alloy magnets".

TECHNICAL FIELD

The present disclosure refers to a device and a method for the addition of liquid additives in the form of a spray during a jet milling step in a process for the manufacture of sintered NdFeB alloy magnets.

BACKGROUND OF THE INVENTION

Permanent NdFeB magnets are based on the third-generation of rare earth materials, which have been intensively developed from up 1983. The magnetic material provides excellent magnetic properties at relatively low ppipeuction price. In recent years, it has attracted much attention in the fields of energy saving and environmental protection, energy generation, automotive, and robots. At present, the general process flow of the manufacturing process of sintered NdFeB magnets includes the following sequence of steps: strip casting of the magnetic alloy, hydrogen decrepitation of the alloy to smaller pieces, jet milling the alloy pieces to an alloy powder, magnetic field forming a blank from the alloy power by isostatic pressing, and sintering the blank followed by heat treatment.

Before and after the jet milling step, few additives may be added and mixed with the material. These additives are mainly antioxidants, for example ester compounds. The uniformity of the industrial mixing process is generally evaluated by the C content intpipeuced by the additives. The specific process for adding additives along with jet milling is as follows:

1) Prior to jet milling additives are added to the smaller pieces of the hydrogen decrepitation. The purpose is to improve the efficiency of jet milling. This is because the additives improve particle's fluidity, prevent the formation of secondary particles, and reduce at the same time the surface energy of the material after adsorption. The additives also accelerate the crack propagation and thus improve the grindability of the material A conventional method of adding additives is generally as follows: At first, a ball valve of the powder container is opened. Then a funnel is put at the opening and finally the additives are poured through the funnel into the powder container. This method has the following disadvantages:

a) While opening the ball valve, a small amount of air will be intpipeuced and may contact with the powder. This will cause oxidation of the powder, which may worsen the magnetic performance.
b) The additives may aggregate together, and it usually takes a longer time to mix.
c) During the mixing process, the powder in the ball valve agglomerates together with the additives, which will block the ball valve.

2) After jet milling lubricants are usually added. The main function is to improve the orientation of the alloy powder particles during the press forming process and thereby improve the magnetic properties. There are generally the following four process routes known in the state of art for mixing after jet milling:

1. Mixing is performed in a powder tank. The time is generally about 3-4 h and the filling rate of the tank is generally about 60-80% of the total volume of the tank.
2. The lubricant is added to the powder tank, pre-mixed for 1-2 h, and then the pre-mixed powder is put in two or more tanks of a V-type mixer for finalizing the mixing.
3. The powder is put into the tank of a high shear mixing machine, lubricant is added, and mixing is started. The mixing time is generally less than about 0.5 h.
4. The high-shear mixing machine may be directly connected to the jet milling equipment to achieve an inline mixing process.

Lubricants for the above-mentioned mixing processes are generally added through an opening hole of the powder tank or the main body of the mixing machine, which also has the shortcomings a)-c) described in the pre-powder mixing.

In CN 108480648 A holes are opened on the side wall of the powder tank and a fluid pump is used for to adding the additives during jet milling process. Although the uniformity of the mixing is improved, the hole in the tank contacts with the powder during the mixing process, and is usually blocked by the mixture of additives and powder, which is inconvenient to clean. Also, the opening hole increases the risk of oxidation of the powder in the powder tank. CN 209174907 U provides a solution similar to CN 108480648 A, which uses pulsed airflow instead of a flow pump, which also have same contamination and blocking problems. CN 202367198 U uses a tooling box above the powder tank. The bottom of the box has 10 to 200 micrometer pores. Since very small amount of antioxidant (additives) is added, and this tool box has a large floor area, significant amounts of the additive may remain. Also, during the adding process the additives may flow on the tank wall, and the powder will adhere to the container during the mixing process, which is not easy to clean up. These withdraws will inevitably affect the actual added amount of additives and the uniformity of the mixing. CN 104399995 A discloses another method for adding additives before the jet milling starts. At one side of the raw material feeding pipe, the additive is atomized and added with relatively high-pressure gas. Since the actual amount of the adding additive is very small, the flow control of the additive is very difficult and the addition is intermittent. The nozzle inside the pipe is also easy to block, and the use of high-pressure gas poses a safety risk.

SUMMARY OF THE INVENTION

According to one aspect of the present disclosure, there is provided a device for the addition of liquid additives in the form of a spray during a jet milling step in a process for the manufacture of sintered NdFeB alloy magnets. The device includes:

a storage barrel for the liquid additive;

a weighing bucket which is in fluid communication with the storage barrel and is adapted for weighing a predetermined amount of the liquid additive;

- a powder container to accommodate NdFeB alloy material prior to or after jet milling, wherein the powder container includes an opening that is plugged with a blind flange;
- a connecting pipe, which is in fluid communication with the weighing bucket and passes through an opening of the blind flange into the interior of the powder container; and
- a fluid atomization nozzle located at the end of the connection pipe.

According to another aspect of the present disclosure, there is provided a method for the addition of liquid additives in the form of a spray during a jet milling step in a process for the manufacture of sintered NdFeB alloy magnets. The method includes the steps of:

- a) providing a device as mentioned above;
- b) introducing liquid additive from the storage barrel to the weighing bucket and weighing a predetermined amount of the liquid additive; and
- c) spraying the weighted amount of the liquid additive via the connection pipe and the fluid atomization nozzle into the interior of the powder container.

Further embodiments of the disclosure could be learned from the following description.

The Reference Signs:

DETAILED DESCRIPTION OF THE INVENTION

To have a better understanding of the present disclosure, the examples set below provide illustrations of the present disclosure. The examples and the schematics of the device structure are only used to illustrate the present disclosure and do not limit the scope of the present disclosure.

Figure 1:
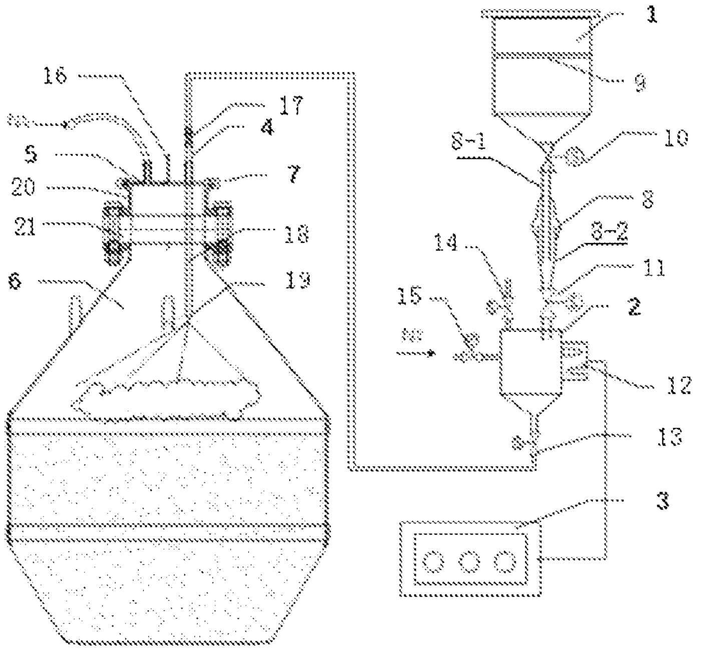
FIG. 1 illustrates a device according to an embodiment of the present disclosure.

FIG. 1 illustrates a device for the addition of liquid additives in the form of a spray during a jet milling step in a process for the manufacture of sintered NdFeB alloy magnets according to an embodiment of the present disclosure. The device includes:

- a storage barrel 1 for the liquid additive (such as an antioxidant, for example, a liquid organic ester compound);
- a weighing bucket 2 which is in fluid communication with the storage barrel 1 and is adapted for weighing a predetermined amount of the liquid additive;
- a powder container 6 to accommodate NdFeB alloy material prior to or after jet milling, wherein the powder container 6 includes an opening 20 that is plugged with a blind flange 5;
- a connecting pipe 4, which is in fluid communication with the weighing bucket 2 and passes through an opening 5-2 of the blind flange 5 into the interior of the powder container 6; and
- a fluid atomization nozzle 19 located at the end of the connection pipe 4.

A port to the connection pipe 4 is located at a bottom of the weighing bucket 2. The weighing bucket 2 is designed in such a way that the weighed liquid additive is collected at the port to the connection pipe 4 and the weighing bucket 2 further includes a gas port adapted for applying a pressurized gas in a space above the collected liquid additive. The weighing bucket 2 further includes a weighing sensor 12 for accurately weighing the liquid additive. The load cell 12 is controlled by a controller unit 3.

The device includes a switchable valve 13 adapted for opening and closing the connection tube 4, a switchable valve 15 adapted for opening and closing the gas port, and the control unit 3 which is designed to control the switchable valves 13, 15. The device further includes a switchable valve 14 which may be used for exhausting gas from the weighing bucket 2.

The storage barrel 1 is in fluid communication with the storage barrel 1 via a liquid line 8. The device further includes a switchable valve 10 and a switchable valve 11 adapted for opening and closing the liquid line 8. The control unit 3 is also designed to control the switchable valves 10, 11. Each of the switchable vales 10, 11, and 13-15 may be a solenoid valve. The storage barrel 1 further includes a filter screen 9 for filtering impurities. The liquid line 8 may include a silicone hose, a first sleeve 8-1, and a second sleeve 8-2.

Figure 2:
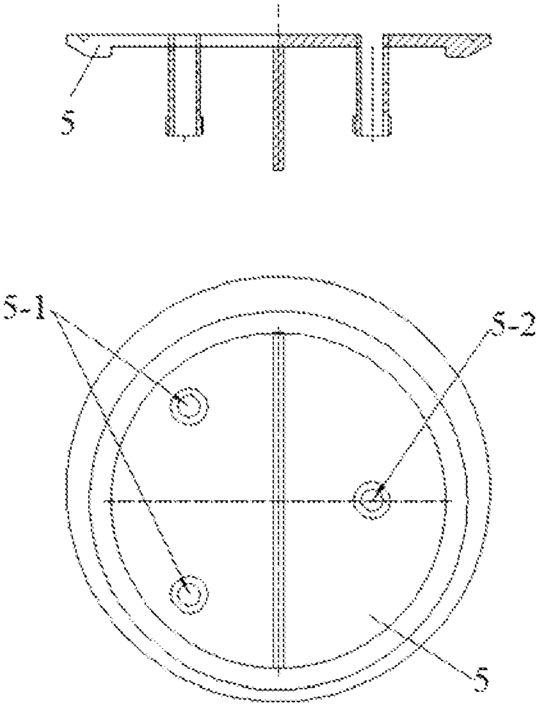
FIG. 2 is a view on the top surface of the blind flange used in the embodiment of FIG. 1.

The blind flange 5 further includes openings 5-1 for air replacement, which is illustrated in FIG. 2. A clamp 7 secures the blind flange 5 at the powder container 6. The connection tube 4 may be divided into two separate pipelines which can be connected by a quick connector 17. Pipeline 18 extends into the power container 6. The device may further include a handle 16 and a butterfly valve 21.

A method for the addition of liquid additives in the form of a spray during a jet milling step in a process for the manufacture of sintered NdFeB alloy magnets makes use of the above-mentioned device and includes the steps of:

- a) providing the above-mentioned device;
- b) introducing liquid additive from the storage barrel 1 to the weighing bucket 2 and weighing a predetermined amount of the liquid additive; and
- c) spraying the weighted amount of the liquid additive via the connection pipe 4 and the fluid atomization nozzle 19 into the interior of the powder container 6.

The port to the connection pipe 4 is located at a bottom of the weighing bucket 2. The weighing bucket 2 is designed in such a way that the weighed liquid additive is collected at the port to the connection pipe 4 and the weighing bucket 2 further includes a gas port adapted for applying a pressurized gas (specifically an inert gas, like nitrogen) in a space above the collected liquid additive. The pressurized gas is applied to the weighing bucket 2 via the gas port so as to spray the collected liquid additive into the powder container 6.

The device includes the switchable valve 13 adapted for opening and closing the connection tube 4, the switchable valve 15 adapted for opening and closing the gas port, and the control unit 3 which is designed to control the switchable valves 13, 15. The control unit 3 is opening the both switchable valves 13, 15 for spraying the liquid additive into the powder container 6.

The storage barrel 1 is in fluid communication with the storage barrel 1 via the liquid line 8. The device further includes the switchable valves 10 and 11 adapted for opening and closing the liquid line 8, and the control unit 3 is designed to control the switchable valves 10, 11. The control unit 3 is opening the at least one switchable valve 10, 11 for introducing the liquid additive into the weighing bucket 2.

The blind flange 5 includes openings 5-1 for air replacement, and an inert gas is introduced into the interior of the powder container 6 via the openings 5-1 of the blind flange 5.

A first amount of liquid additive is introduced into the powder container 6 and mixed for 1 to 2 h before starting jet milling, and a second amount of liquid additive is introduced into the powder container 6 and mixed for 2 to 4 h after jet milling.

In other words, the disclosure provides an additive atomizing device for a NdFeB magnetic powder mixing process, which includes a storage barrel 1 for storing liquid additives. The cover of the barrel 1 has a sealing ring, and inside the barrel there is a filter screen 9 for filtering impurities in the additive. Preferably, the filter screen size is 60-100 mesh. The bottom of the storage barrel 1 is provided with a solenoid valve 10 and the conical bottom outlet of the storage barrel 1 is provided with a solenoid valve 11 and is used for weighing additives. The weighing bucket 2 is softly connected. The weighing bucket 2 is equipped with a weighing sensor 12, which is electrically connected to the control unit 3 for setting the weight of additives. The weighing bucket 2 is also connected to the connecting pipe 4 by PU tubing through solenoid valve 13. The solenoid valve 14 is used for air vent while weighting. The solenoid valve 15 is connected to the gas source, for example nitrogen. The connecting pipe 4 extends into the powder container 6 through the opening 5-2 of the blind flange 5. One side of the connecting pipe 4 is provided with a quick connector 17. The length of the pipeline 18 can be adjusted according to the size of the powder container. The appropriate length of the pipeline 18 is decided by an angle of the fluid atomizing nozzle 19 at the end of the pipeline 18 and the distance from the nozzle 19 to the powder inside the container 6 and the diameter of the container 6. The blind flange 5 has two openings 5-1, which are used to replace the air in the space between the powder container 6 and the blind flange 5. This avoids the probability of oxygen contact of the powder. The blind flange 5 is sealed with the clamp 7 and connected to the powder container 6.

Further, the outlet of the storage barrel 1 and the inlet of the weighing bucket 2 are connected by a soft connection, and the operation of the storage barrel 1 will not affect the weighing process of the weighing bucket 2. Specifically, the outlet of the storage barrel 1 is connected to the solenoid valve 10. The first sleeve 8-1 extends into the second sleeve 8-2 with a larger diameter. The first sleeve 8-1 and the second sleeve 8-2 are covered with a silicone hose 8, and the first sleeve 8-1 is connected to the solenoid valve 10. The second sleeve 8-2 is connected to the solenoid valve 11 and the solenoid valve 11 is connected to the inlet of the weighing bucket 2.

The connecting pipe 4 is provided for intpipeucing the additives into the powder container 6. The connecting pipe 4 is provided with a quick connector 17, and the connecting pipe 4 can be divided into two parts by the quick connector 17, one part of which is connected with the outlet pipe of the weighing bucket 2. Thereby, it is easy to disassemble and clean the device. The other part goes deep into the powder container 6 and connects the fluid atomization nozzle 19 at its end. The length of the pipeline 18 is determined by the height of the powder in the powder container 6 and the spray coverage angle of the fluid atomization nozzle 19. In this way, the atomized additives can cover the powder to the greatest extent.

The present disclosure provides an additive atomizing adding method of a neodymium iron boron magnetic during the powder mixing process. The additive is a liquid additive. The adding device as above is used. The adding methods are as follows:

a. Set the additive weight through the control unit 3, then the controller opens the solenoid valve 10 and the solenoid valve 11, and start weighing the additives. When the set weight is reached, the solenoid valve 10 and the solenoid valve 11 are closed.
b. Connect the blind flange 5 with a clamp 7 to the powder container 6, then open the two replacement ball valves on the flange plates, use nitrogen or argon to replace the space between the blind flange 5 and the upper portion of the container 6 for 1 minute;
c. Open the powder container's butterfly valve 21, open the third valve on the blind flange 5, put the connecting pipe into the powder container 4 via the valve and keep the air replacement of step b;
d. Add additives by the control unit 3. At this time, the solenoid valve 11 and the solenoid valve 14 are closed, the solenoid valve 13 and the solenoid valve 15 are opened, and the additive is atomized by air pressure and added to the surface of the powder in the container 6.
e. After the addition is completed, remove the connecting pipe 4, to close the powder container valve 21, remove blind flange 5 and the replacement gas source.

Further, the mixing process of NdFeB magnetic powder mixture is as follows:

1. Mixing before milling: the additive is added to the powder tank according to the method mentioned above (step a-e), and then mix the powder and the additive with a three-dimensional mixer, in some embodiments, the mixing time is 1-1.5 hours, next the jet milling process is carried out.
2. Mixing after milling, the additive is added to a mixer according to the method mentioned above (step a-e), the mixer may be a three-dimensional mixer (mixing in the powder tank of jet milling), V-type mixer, or high shear mixer, in some embodiments, the mixing time are 2-3.5 hours, 2-4 hours, 20-25 minutes, accordingly.

The present disclosure provides a neodymium iron boron powder with a smaller deviation in C content. The powder is made by jet milling and is obtained by using the device and method of the present disclosure. The powder and ester additives are mixed with a better mixture homogeneity, more specifically, when sampling from 8 different positions of the powder container. The samples C content standard deviation is 20 ppm or less, the extreme deviation is 80 ppm or less.

Using the NdFeB powder mentioned above, the present disclosure allows manufacturing a high-quality sintered NdFeB magnet by magnetic forming and sintering process. The NdFeB magnet C element content after sintering has relatively small deviation, more specifically, the C element content standard deviation in a single magnet blank is 20 ppm or less, the extreme deviation is 50 ppm or less. Sampling from 13 different positions of of the sintering furnace, the C element content standard deviation is 30 ppm or less, the extreme deviation is 100 ppm or less.

The present disclosure may provide the following advantages:

1. The adding port is separated from the powder container and does not contact with the powder, and the space of the powder container's opening is replaced with nitrogen or argon before adding, so the reduction of magnetic properties and mechanical properties caused by the oxidation of the powder can be avoided. Thus, the yield of magnets increases. At the same time, the atomizing nozzle or the adding port will not be blocked by the powder, so the cleaning and maintenance of the device can be easily applied, and the additive residue is very small.

2. The mixture homogeneity of the powder and additives is higher than that of traditional addition methods, and the deviation of C element content is small, which is conducive to obtaining high-performance magnets. Moreover, after powdering, the powder needs only be mixed for one time so the mixing period is significantly shortened.

The is provided an atomizing liquid adding device and an adding method of a NdFeB magnetic powder mixing process. By adopting the device and the mixing method, the adding device does not directly contact the powder, and the air replacement process in the connecting part is unpieced, which can effectively avoid the oxidation of the powder during the additive adding process, and powder aggregation and blocking in the addition port are also avoided, which makes it easy to clean and maintain. Also, the atomized additive droplets are directly sprayed on the powder during addition, and will not be sprayed on the inner wall of the container to which will cause the powder agglomerate on the wall. This will increase the accuracy of the amount of additive and the mixture homogeneity, compared with the traditional one-time funnel addition method. It can effectively avoid local oxidation of the powder, which is helpful for obtaining high-performance magnets with uniform C content, and can shorten the powder mixing period.

The device may include a storage barrel containing a sieve screen, and a weighing bucket connected to the bottom of the storage barrel via flexible connection. A load sensor may be fixed to one side of the weighing bucket to weight the additive according to manual setting. The device further includes a connection pipe with a fluid atomizing nozzle at the end and a blind flange connected with the powder container. The powder container of this application is selected as the powder tank or the mixing machine. The blind flange is provided with three outlets, wherein two of them are used for air replacement in the interior of the powder container and one is used for putting through the connecting pipe 4.

When adding additives, first connect the blind flange to the powder tank or the feeding port of the mixing machine with a gasket and connect them with a clamp. A butterfly valve is set in the opening of the powder tank or the mixing machine. The connecting part between the butterfly valves forms a displacement space. Replace the air in the connecting part with nitrogen or argon. Then, the connecting pipe is inserted into the powder tank or the mixing machine to a certain depth, and the weighed additive in the weighing bucket is atomized to the powder container through air pressure. Finally, the powder and the additive are mixed together. The device and method can obtain NdFeB powder with small deviation of C element content, which means a better mixture homogeneity of the additive and the powder; At the same time, the additive adding process is separated from the powder container body, which effectively avoids the oxidation of the powder and thus improve the mechanical properties and the consistency of the magnetic. Compared with the traditional way of adding the additive by pouring the additive into a funnel on the powder container, the additive and the powder are mixed more uniformly and the mixing cycle can be effectively shortened, particle agglomeration is also effectively avoided, which has high practical value. The solenoid valves and weighing sensor in this application are all electrically connected to the control system, and the control system can be easily implemented by conventional methods in this field, and will not be described in detail.

In the following examples, a device as illustrated in FIG. 1 has been used.

Implementing Example 1

A tank of powder before jet milling and the powder weight was 360 kg, using the device of the present disclosure to atomize and add antioxidants, and then mixed on a three-dimensional mixer for 1.5 hours. During the jet milling process, 8 samples were taken to test the deviation of C element content in the powder.

Implementing Example 2

After jet milling, two tanks of NdFeB powder weighted 700 kg, were taken into a V-type mixer, using the device of the present disclosure to atomize and add additive, and then mixed for 4 hours. During the following magnetic powder forming process, 8 samples were taken to test the deviation of C element content in the powder.

Implementing Example 3

After jet milling, two tanks of NdFeB powder weighted 700 kg, were taken into a V-type mixer, using the device of the present disclosure to atomize and add additive, and then mixed for 4 hours. After the subsequent forming and sintering process, 13 blank magnets were sampled from the sintering furnace (corners and edge centers of the upper, middle, and lower layers and the body center) to test the deviation of C element content.

Implementing Example 4

After jet milling, two tanks of NdFeB powder weighted 700 kg, were taken into a V-type mixer, using the device of the present disclosure to atomize and add additive, and then mixed for 4 hours. After the subsequent forming and sintering process, took one sample from the furnace and according to FIG. 3, the sample was sliced from top to bottom to test the deviation of C element content in a single magnet blank.

Comparative Example 1

A tank of powder before jet milling and the powder weight was 360 kg, using a conventional method to intpipeuce the same amount of additives from the opening on the cone wall of the powder container with a funnel, and then mixed on a three-dimensional mixer for 1.5 hours. During the jet milling process, 8 samples were taken to test the deviation of C element content in the powder.

Comparative Example 2

After jet milling, two tanks of NdFeB powder weighted 700 kg, were pre-mixed in the powder tank with a three-dimensional mixer for 1.5 hours, and then took the 2 tanks of powder into a V-mixer for 4 hours. During the following magnetic powder forming process, 8 samples were taken to test the deviation of C element content in the powder.

Comparative Example 3

After jet milling, two tanks of NdFeB powder weighted 700 kg, were pre-mixed in the powder tank with a three-dimensional mixer for 1.5 hours, and then took the 2 tanks of powder into a V-mixer for 4 hours. After the subsequent forming and sintering process, 13 blank magnets were sampled from the sintering furnace (corners and edge centers of the upper, middle, and lower layers and the body center) to test the deviation of C element content.

Comparative Example 4

After jet milling, two tanks of NdFeB powder weighted 700 kg, were pre-mixed in the powder tank with a three-dimensional mixer for 1.5 hours, and then took the 2 tanks of powder into a V-mixer for 4 hours. After the subsequent forming and sintering process, took one sample from the furnace and according to FIG. 3, the sample was sliced from top to bottom to test the deviation of C element content in a single magnet blank.

The C element content of the above examples are shown in table 1 to table 4 as follows:

TABLE 1

| Num. | Example | C element content | Example | C element content |
|---|---|---|---|---|
| 1 | IMPLEMENTING | 0.0443 | COMPARATIVE | 0.0497 |
| 2 | EXAMPLE 1 | 0.0449 | EXAMPLE 1 | 0.0502 |
| 3 | | 0.0449 | | 0.0510 |
| 4 | | 0.0453 | | 0.0485 |
| 5 | | 0.0446 | | 0.0480 |
| 6 | | 0.0430 | | 0.0504 |
| 7 | | 0.0449 | | 0.0481 |
| 8 | | 0.0442 | | 0.0490 |

Table 1 shows 8 results of the C content deviation of the implementing example 1 and comparative example 1 during the jet milling process.

TABLE 2

| Num. | Example | C element content | Example | C element content |
|---|---|---|---|---|
| 1 | IMPLEMENTING | 0.0453 | COMPARATIVE | 0.0330 |
| 2 | EXAMPLE 2 | 0.0438 | EXAMPLE 2 | 0.0341 |
| 3 | | 0.0430 | | 0.0352 |
| 4 | | 0.0424 | | 0.0335 |
| 5 | | 0.0405 | | 0.0477 |

TABLE 2-continued

| Num. | Example | C element content | Example | C element content |
|---|---|---|---|---|
| 6 | | 0.0411 | | 0.0345 |
| 7 | | 0.0409 | | 0.0364 |
| 8 | | 0.0441 | | 0.0341 |

Table 2 shows 8 results of the C content deviation of the implementing example 2 and comparative example 2 during the magnetic forming process.

TABLE 3

| Num. | Example | C element content | Example | C element content |
|---|---|---|---|---|
| 1 | IMPLEMENTING | 0.0746 | COMPARATIVE | 0.0623 |
| 2 | EXAMPLE3 | 0.0768 | EXAMPLE 3 | 0.0580 |
| 3 | | 0.0771 | | 0.0547 |
| 4 | | 0.0766 | | 0.0587 |
| 5 | | 0.0759 | | 0.0589 |
| 6 | | 0.0764 | | 0.0542 |
| 7 | | 0.0766 | | 0.0555 |
| 8 | | 0.0768 | | 0.0606 |
| 9 | | 0.0770 | | 0.0610 |
| 10 | | 0.0772 | | 0.0617 |
| 11 | | 0.0837 | | 0.0580 |
| 12 | | 0.0770 | | 0.0688 |
| 13 | | 0.0741 | | 0.0634 |

Table 3 shows the C content deviation of implementing example 3 and comparative example 3.

TABLE 4

| Num. | Example | C element content | Example | C element content |
|---|---|---|---|---|
| 1 | IMPLEMENTING | 0.0557 | COMPARATIVE | 0.0725 |
| 2 | EXAMPLE 4 | 0.0525 | EXAMPLE 4 | 0.0677 |
| 3 | | 0.0525 | | 0.0755 |
| 4 | | 0.0535 | | 0.0666 |
| 5 | | 0.0558 | | 0.0816 |
| 6 | | 0.0542 | | 0.0695 |
| 7 | | 0.0526 | | 0.0699 |
| 8 | | 0.0571 | | 0.0686 |
| 9 | | 0.0542 | | 0.0682 |

Figure 3:
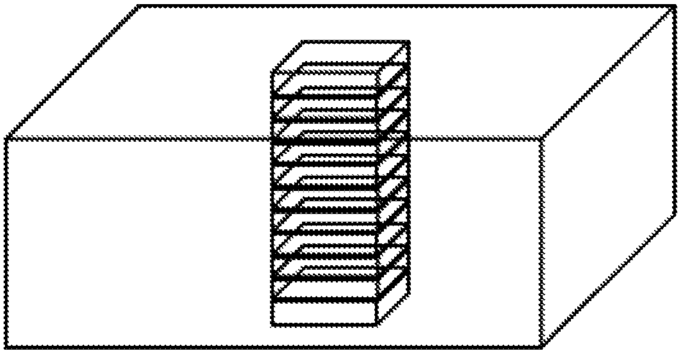
FIG. 3 is a schematic illustration of sliced sintered NdFeB magnets.

Table 4 shows the deviation of C content results of the implementing example 4 and comparative example 4 according to FIG. 3 to slice a single blank from top to bottom.

The deviation results of the above examples and comparative examples are shown in table 5:

TABLE 5

| Example | Standard deviation/ppm | [max-min]/ppm |
|---|---|---|
| COMPARATIVE EXAMPLE1 | 11 | 30 |
| IMPLEMENTING EXAMPLE 1 | 7 | 23 |
| COMPARATIVE EXAMPLE2 | 48 | 147 |
| IMPLEMENTING EXAMPLE2 | 17 | 48 |
| COMPARATIVE EXAMPLE3 | 40 | 146 |
| IMPLEMENTING EXAMPLE3 | 22 | 96 |
| COMPARATIVE EXAMPLE4 | 47 | 150 |
| IMPLEMENTING EXAMPLE4 | 16 | 45 |

For implementing example 1 and comparative example 1: The accuracy of the amount of additive and the mixture homogeneity is increased, compared with the traditional one-time funnel addition method, it can effectively avoid local oxidation of the powder, which is helpful for obtaining high-performance magnets with uniform C content, and can shorten the powder mixing period 7 ppm and 11 ppm respectively. The [max-min] value of the C content are 7 ppm and 23 ppm. It's clear that the implementing of this present disclosure has a smaller C element content deviation, which means a better mixture homogeneity and conventional uniformity, besides, implementing example has a lower mixing cycle.

For implementing example 2 and comparative example 2 after jet milling: the standard deviation of the C content are 17 ppm and 48 ppm respectively, the [max-min] value of the C content are 48 ppm and 147 ppm, the implementing example of this present disclosure has a much smaller C content deviation and a obviously shorter mixing cycle.

For implementing example 3, implementing example 4 and comparative example 3, comparative example 4: after powder magnetic forming and sintering process, the C element content deviation of the magnets made by the present disclosure are much smaller to magnets made by the conventional way. Which means a better consistency in magnetic performance.

In addition, according to the statistics on the yield of magnets, the defects of foreign matter in the magnets caused by the oxidation of the powder have been reduced from 0.15% to 0.07%.

In summary, by using the device and method of the present disclosure, the chance of powder oxidation is effectively avoided, thus reduction of magnetic properties and mechanical properties caused by powder oxidation is also reduced, so the yield rate of the magnets is improved, and since the powder will not block the adding port and the atomizing nozzle, the cleaning and maintenance process is simple and the additive residue is less. In addition, the mixture homogeneity of the powder is much better than that of the traditional way, which is good for obtaining uniform, stable and consistent NdFeB magnets, besides, the mixing cycle is significantly shortened.

What is claimed is:

1. Device for the addition of liquid additives in the form of a spray during a jet milling step in a process for the manufacture of sintered NdFeB alloy magnets, wherein the device comprises:

a storage barrel (1) for the liquid additive;

a weighing bucket (2) which is in fluid communication with the storage barrel (1) and is adapted for weighing a predetermined amount of the liquid additive;

a powder container (6) to accommodate NdFeB alloy material prior to or after jet milling, wherein the powder container (6) includes an opening (20) that is plugged with a blind flange (5);

a connecting pipe (4), which is in fluid communication with the weighing bucket (2) and passes through an opening (5-2) of the blind flange (5) into the interior of the powder container (6); and a fluid atomization nozzle (19) located at the end of the connecting pipe (4).

2. The device as claimed in claim 1, wherein a port to the connecting on pipe (4) is located at a bottom of the weighing bucket (2), the weighing bucket (2) is designed in such a way that the weighed liquid additive is collected at a port to the connecting pipe (4) and the weighing bucket (2) further comprises a gas port adapted for applying a pressurized gas in a space above the collected liquid additive.

3. The device as claimed in claim 2, wherein the device comprises a switchable valve (13) adapted for opening and closing the connecting pipe (4), a switchable valve (15) adapted for opening and closing the gas port, and a control unit (3) which is designed to control the switchable valves (13, 15).

4. The device as claimed in claim 3, wherein the storage barrel (1) is in fluid communication with the storage barrel (1) via a liquid line (8), the device further comprises at least one switchable valve (10, 11) adapted for opening and closing the liquid line (8), and the control unit (3) is designed to control the at least one switchable valve (10, 11).

5. The device as claimed in claim 1, wherein the blind flange (5) further comprises openings (5-1) for air replacement.

6. The device as claimed in claim 1, wherein the storage barrel (1) comprises a filter screen (9) for filtering impurities.

7. The device as claimed in claim 2, wherein the blind flange (5) further comprises openings (5-1) for air replacement.

8. The device as claimed in claim 3, wherein the blind flange (5) further comprises openings (5-1) for air replacement.

9. The device as claimed in claim 4, wherein the blind flange (5) further comprises openings (5-1) for air replacement.

10. The device as claimed in claim 2, wherein the storage barrel (1) comprises a filter screen (9) for filtering impurities.

11. The device as claimed in claim 3, wherein the storage barrel (1) comprises a filter screen (9) for filtering impurities.

12. The device as claimed in claim 4, wherein the storage barrel (1) comprises a filter screen (9) for filtering impurities.

* * * * *